United States Patent

Ballard

[11] Patent Number: 5,175,713
[45] Date of Patent: Dec. 29, 1992

[54] LASER SOUND DETECTOR

[75] Inventor: Samuel S. Ballard, Hollis, N.H.

[73] Assignee: Lockheed Sanders, Inc., Nashua, N.H.

[21] Appl. No.: 550,282

[22] Filed: Nov. 9, 1983

[51] Int. Cl.[5] .................... H04R 23/00; H04P 13/02
[52] U.S. Cl. ................................. 367/151; 340/557; 73/657
[58] Field of Search ............ 367/151, 178, 149; 340/557, 850; 181/104, 110, 122; 73/653, 657

[56] References Cited

U.S. PATENT DOCUMENTS

| 3,278,753 | 10/1966 | Pitts . | |
|---|---|---|---|
| 3,373,401 | 3/1968 | Bayer | 367/178 |
| 3,474,253 | 10/1969 | Kessler . | |
| 3,499,110 | 12/1969 | Heckman . | |
| 3,604,803 | 8/1971 | Kahn . | |
| 3,611,277 | 10/1971 | Yoder . | |
| 3,669,540 | 5/1972 | Rattman . | |
| 3,775,735 | 4/1973 | Funk . | |
| 4,050,819 | 9/1977 | Lichtman . | |
| 4,053,233 | 10/1977 | Bien et al. | 340/557 |
| 4,123,944 | 11/1978 | Mezrich et al. | 73/657 |
| 4,155,065 | 5/1979 | Stimler | 367/178 |
| 4,203,108 | 5/1980 | Eknayan | 340/850 |
| 4,284,350 | 8/1981 | Coon et al. | 73/657 |
| 4,422,167 | 12/1983 | Shajenko | 367/178 |
| 4,466,738 | 8/1984 | Huang et al. | 73/657 |

FOREIGN PATENT DOCUMENTS

| 0638907 | 12/1978 | U.S.S.R. | 367/178 |
|---|---|---|---|
| 1513249 | 11/1975 | United Kingdom | 73/657 |

Primary Examiner—Nelson Moskowitz
Attorney, Agent, or Firm—David W. Gomes

[57] ABSTRACT

In order to sense the presence of sound in a remote underwater location, a neutrally buoyant reflector (20) is deployed underwater, and a laser (12) disposed at a remote location aims coherent light at the reflector (20). A detector (24) senses the coherent light reflected from the reflector (20) and compares it in phase with coherent light split from the outgoing beam. The system then provides an indication of the presence of sound by, for instance, amplifying the result of the phase detection to a speaker (26).

3 Claims, 1 Drawing Sheet

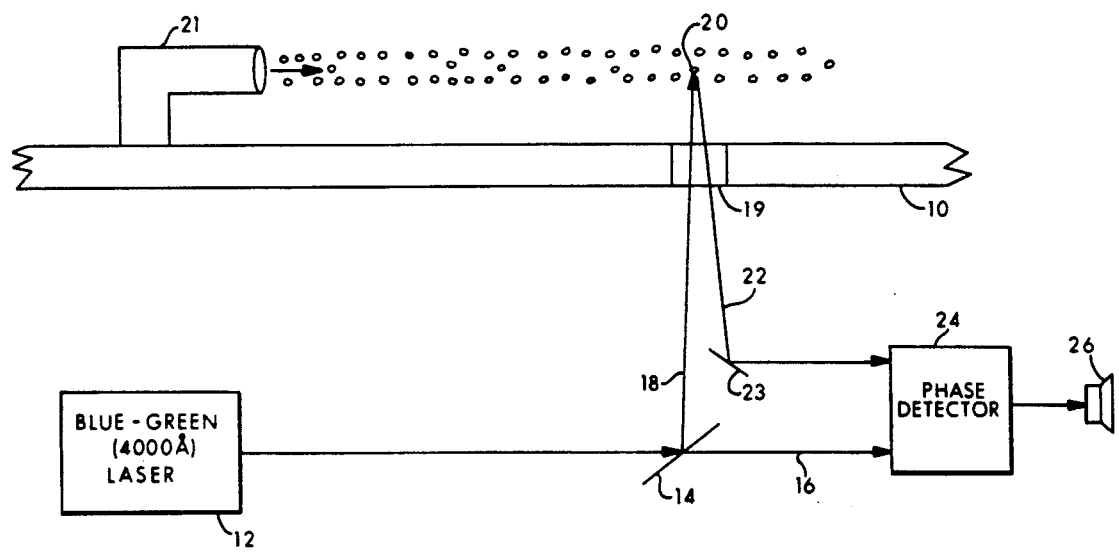

LASER SOUND DETECTOR

BACKGROUND OF THE INVENTION

The present invention is directed to sound sensors for detecting underwater sound. It is specifically directed to optical methods of sound detection.

There are numerous applications for underwater sound detection in exploration, navigation, and warfare. Recent attempts have been made to use optical means for detecting the sound. For instance, in U.S. Pat. No. 3,474,253 to Kessler, a device is described in which coherent light is sent through water in the vicinity where sound is to be detected, and the frequency shift due to Brillouin scattering is detected to determine the presence of sound in the region between a light detector and the source of the coherent light. Whatever the virtues of this method may be, it requires that both the light source and the light sensor be positioned at the location where the sound is to be sensed. Accordingly, if the Kessler device is to be used for remote detection of sound, a rather elaborate and expensive device carrying a source of power must be left at the position to be monitored.

An alternate arrangement that solves some of these problems is described in U.S. Pat. No. 3,611,277 to Yoder. In the Yoder system, a source of coherent light may be positioned on, for instance, a helicopter. The coherent light is directed to a floating reflective device that sits in the water and includes a reflective diaphragm. The membrane contacts the water on one side so as to vibrate in response to sound in the water. The float contains a beam splitter for splitting the received coherent light into two beams, one beam being directed at the reflective diaphragm and the other beam being directed at a stationary reflector also contained in the float. Light from both the stationary reflector and the diaphragm is reflected back to a sensor in the helicopter, where the resultant amplitude variations caused by the changing phase relationship between the interfering beams are detected to provide an indication of the presence of sound in the water.

With the Yoder arrangement, the occurrence of sound at a remote location is detected without the necessity for any mechanical connection between the detection electronics and the float at the remote location. Furthermore, the device left at the remote location is a passive device and so does not need a power source that eventually requires replacement. However, the Yoder device, while considerably simpler than that described in the Kessler patent, nonetheless has some mechanical complexity. In particular, the reflective diaphragm must be mounted in such a way as to permit motion with respect to its mounting structure and to provide an interface between seawater and the interior of the device. Furthermore, the spring-mass system of the diaphragm and its mounting necessarily have an effect on the detected signal, and care must be made in design to minimize this effect.

It is accordingly an object of the present invention to detect underwater sound optically by employing a method in which the device that is to be left at a remote location is simple and inexpensive and responds faithfully to the sound signal.

SUMMARY OF THE INVENTION

The foregoing and related objects are achieved in an underwater-sound detection method in which a reflector of substantially neutral buoyancy is placed in the water at the position where sound is to be detected. Coherent light is directed to the reflector from a remote location, and light reflected from the reflector is sensed at the same remote location. Since the reflector is of substantially neutral buoyancy, the water-particle motion associated with the underwater sound is faithfully followed by the motion of the reflector, and the reflected light is accordingly phase-modulated in accordance with the sound at the position of the reflector.

By using this method, it is possible to sense sound by leaving very inexpensive reflectors at the locations where sound is to be sensed. The signal returned from a reflector, because of its substantially neutral buoyancy, is a faithful analog of the sound signal in the water.

BRIEF DESCRIPTION OF THE DRAWING

These and further features and advantages of the present invention can be appreciated by reference to the sole accompanying drawing, which is a diagrammatic representation of the apparatus of the present invention.

DETAILED DESCRIPTION OF THE PREFERRED EMBODIMENT

An apparatus for carrying out the present invention is depicted diagrammatically in FIG. 1. The bulk of the apparatus is contained in a platform, such as a ship or submarine represented in the drawing by its hull 10. Mounted on the platform is a source of coherent light, such as a laser 12, which directs light to a beamsplitter 14 depicted as a half-silvered mirror. The beamsplitter 14, in turn, splits the beam into two beams 16 and 18. Beam 16 consists of light that continues through the beamsplitter 14, while beam 18 consists of light reflected from the beamsplitter 14. Beam 18 continues out of the platform by way of a viewing port 19 and through the water to a reflector 20.

In the illustrated embodiment, reflectors are placed in the water by a dispensing mechanism 21 on the ship or submarine. In some cases, it may be preferable to drop the reflectors from an aircraft, particularly if the platform is itself an aircraft.

The reflector 20 can be a very simple device such as a spherical body covered with retroreflective cube-corner faces. It is of substantially neutral buoyancy. It may be desirable to have its average density differ slightly from that of the water if it is to be secured to an anchor or float to keep it at a desired depth in the water, but the difference should not be substantial. Furthermore, it is desirable that the size of the reflector be small in comparison with the wavelength of sound at the frequencies of interest. If the requirements of neutral buoyancy and small size are met, then the motion of the reflector will faithfully follow the water motion caused by the pressure (i.e., sound) waves. As a consequence, the motion of the reflector is a faithful representation of sound in the region.

The retroreflective surface of the reflector 20 returns the coherent light in a path 22 to a mirror 23, which reflects the light to a phase detector 24. The detector 24 detects phase differences between the transmitted and reflected light and provides an indication of the sound-modulated phase difference. The signal representing the phase difference may simply be amplified and applied to a speaker 26, but other indications of the sound signal can also be provided.

The phase changes detected by detector 24 can result not only from the motion of the reflector 20 but also from the motion of the platform. Accordingly, it is desirable that the platform motion be either held to a minimum or monitored so that appropriate compensation can be made. In the alternative, the laser 12 and detector 24 can be mounted so as to isolate them from platform-motion frequency components of interest.

Typically, the laser 12 will be aimed at several reflectors 20 in succession, or several lasers will be aimed simultaneously at a number of the reflectors 20. The position of the source of the sound waves can then be determined by comparing the phases of the sound signals at the various reflectors. If the reflectors 20 are relatively close to the platform and the sound source is relatively far away—i.e., if it is known that the source of the sound is not much closer to one of the reflectors 20 than it is to the others—it is also possible to determine the direction of the source by simply comparing the amplitudes of the phase-modulation signals from the several reflectors 20. In such a case, the source of the sound will lie in the direction of the reflector 20 from which the phase-modulation signal is greatest, because the sound-induced motion of that reflector is parallel to the laser path and thus causes the greatest phase-difference change for a given sound-power level.

Although the magnitude of the water-particle motion in sound waves is not large, phase detectors currently available are sensitive enough to detect the phase-difference changes that result from such motion, at least for low frequencies. Instruments are available for sensing optical phase differences on the order of $10^{-5}$ degree. (See, for instance, "Development of an Electronic Interface for a Fiber Optic Interferometic Sensor," Report R81-925261-14, May 1981, prepared for the Naval Research Laboratory by the United Technologies Research Center.) The rms amplitude of water-particle displacement in response to sound waves is approximately 110 angstroms/microbar at 1.0 Hz. If a laser producing light having a wavelength of 4000 angstroms (blue-green) is used, the $11^{-5}$ degree lower limit on the phase detector corresponds to a sound-pressure level of about $10^{-6}$ microbar at 1.0 Hz. Since the ambient ocean noise level can be expected to be on the order of $10^{-4}$ microbar, the sensitivity of the phase detector is not a limiting factor at the lower frequencies. It is only for frequencies on the order of 100 Hz and higher that the sensitivity of the system becomes the limiting factor, and many signals of interest have amplitudes high enough to be detected even at the higher frequencies.

It can thus be seen that the present invention enables the sensing of sound in a remote location through the use of reflectors that are inexpensive enough to justify their deployment for a single use without requiring retrieval, yet the reflectors can readily be made to be simple and rugged enough to be used for extended periods without replacement.

I claim:

1. A method of sensing sound propagating in the ocean, comprising the steps of:
   dispensing a plurality of substantially neutrally buoyant reflectors in the ocean;
   shining coherent light on some or all of said reflectors;
   sensing the coherent light reflected from said reflectors; and
   detecting any modulation in the phase difference between the light shone on any of said reflectors and the light reflected from the same reflector.

2. Apparatus for sensing sound propagating in the ocean, comprising:
   means for dispensing a plurality of substantially neutrally buoyant reflectors in the ocean;
   means for shining coherent light on one or more of said reflectors;
   means for sensing the coherent light reflected from said reflectors; and
   means for detecting any modulation in the phase difference between the light shone on any of said reflectors and the light reflected from the same reflector.

3. Apparatus as defined in claim 2 wherein the relative position between any of said reflectors and said means for shining coherent light is not fixed.

* * * * *